(12) United States Patent
Kim

(10) Patent No.: US 8,402,108 B2
(45) Date of Patent: Mar. 19, 2013

(54) SYSTEM FOR PROVIDING WEB PAGE HAVING HOME NETWORK FUNCTION AND METHOD OF CONTROLLING HOME NETWORK DEVICES

(75) Inventor: Joo-hyun Kim, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 291 days.

(21) Appl. No.: 11/844,710

(22) Filed: Aug. 24, 2007

(65) Prior Publication Data

US 2008/0120408 A1 May 22, 2008

(30) Foreign Application Priority Data

Nov. 22, 2006 (KR) .......................... 10-2006-0116068

(51) Int. Cl.
*G06F 15/16* (2006.01)
(52) U.S. Cl. ........................ 709/208; 709/223
(58) Field of Classification Search .......... 709/223–224, 709/220, 208
See application file for complete search history.

(56) References Cited

U.S. PATENT DOCUMENTS

| | | | |
|---|---|---|---|
| 7,136,709 B2 * | 11/2006 | Arling et al. ..................... 700/65 |
| 7,275,092 B2 * | 9/2007 | Copp ............................. 709/221 |
| 7,516,201 B2 * | 4/2009 | Kovacs et al. .................. 709/223 |
| 7,562,131 B2 * | 7/2009 | Dutta et al. .................... 709/223 |
| 2002/0027569 A1 | 3/2002 | Manni et al. |
| 2006/0080382 A1 | 4/2006 | Dutta et al. |
| 2006/0200570 A1 * | 9/2006 | Stirbu et al. ................... 709/230 |
| 2006/0280190 A1 * | 12/2006 | Chen et al. ..................... 370/401 |

FOREIGN PATENT DOCUMENTS

| | | |
|---|---|---|
| KR | 10-2004-0005464 | 1/2004 |
| KR | 10-2005-0076965 | 7/2005 |
| KR | 2005-119018 | 12/2005 |
| KR | 10-2006-0035177 | 4/2006 |

OTHER PUBLICATIONS

Korean Office Action issued on Mar. 22, 2011, in corresponding Korean Patent Application No. 10-2006-0116068.

* cited by examiner

*Primary Examiner* — Hussein A. Elchanti
(74) *Attorney, Agent, or Firm* — NSIP Law

(57) ABSTRACT

A system for providing a web page having a home network function and a method of controlling home network devices, the system including: a plurality of universal plug and play (UPnP) devices forming a UPnP network, wherein a first UPnP device from among the plurality of UPnP devices includes a web browser having a control point used to control one or more other UPnP devices. Accordingly, the web page including the control point is provided, so that home network devices in various standards can be conveniently used without a firmware upgrade.

26 Claims, 10 Drawing Sheets

FIG. 4

```
<script language="javascript"> function createHttpRequest()
    {
        var request = new ActiveXObject("Microsoft.XMLHTTP");
        request.onreadystatechange = function(){
            if(request.readyState==4)
            {
                var res = request.responseText;
                alert(res);
            }
        } request.open("GET", "http://10.41.132.52:8080/Balance/View.asp");
        request.send("");
    }
</script>
<html>
    <body onload= "createHttpRequest();">
        <table cellSpacing="0" cellPadding="0" width="100%">
            <tr>
                <td>Hellow World
                </td>
            </tr>
        </table>

</body>
</html>
```

FIG. 5

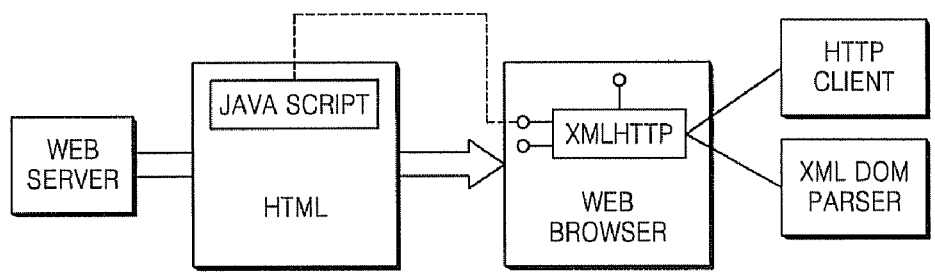

FIG. 8

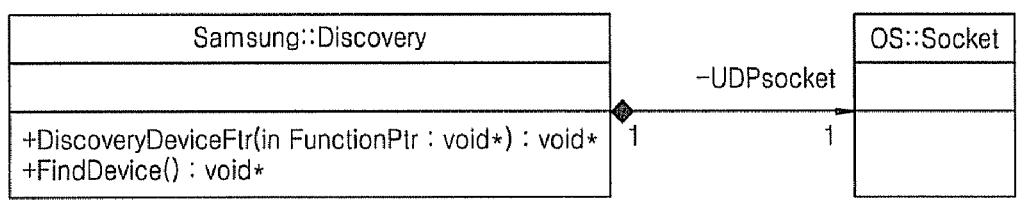

FIG. 9

```
<html>
    <body>
        <script language =javascript>
        function startListen()
        {
            var request = new ActiveXObject("Samsung.Discovery");
            request.FindDevice();

request.DiscoveryDeviceFtr = function(){
                document.DeviceList.deviceInfo.value = request.DeviceList;
            }
        }

</script>
        <table>
            <tr>
                <td>
                    <form name = DeviceList ID="Form1">
                        <input type=text id="deviceInfo" NAME="deviceInfo">
                    </form>
                </td>
            </tr>
        </table>

</body>
</html>
```

FIG. 10

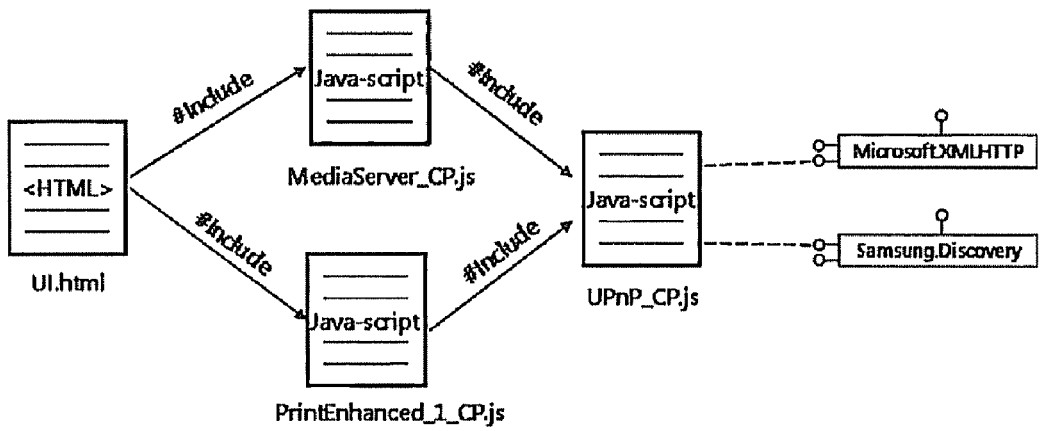

FIG. 11

```
POST /_SwitchPower.0001_control HTTP/1.1
Accept: */*
Accept-Language: ko
Referer: file://D:¥project¥SQASolutions¥Vob¥View¥SEIT¥DoxygenPlus¥[02] Source¥2ndEdition¥DoxygenPlus¥User's Guide¥ajax
soapaction: "urn:schemas-upnp-org:service:SwitchPower:1#SetTarget"
Content-Type: text/xml ; charset="utf-8"
Accept-Encoding: gzip, deflate
User-Agent: Mozilla/4.0 (compatible; MSIE 6.0; Windows NT 5.1; SV1; ...... (atfile.com); .NET CLR 1.1.4322)
Host: 10.88.171.127:54174
Content-Length: 306
Connection: Keep-Alive
Cache-Control: no-cache <?xml version="1.0" encoding="utf-8"?>
<s:Envelope s:encodingStyle="http://schemas.xmlsoap.org/soap/encoding/" xmlns:s="http://schemas.xmlsoap.org/soap/envel
    <s:Body>
        <u:SetTarget xmlns:u="urn:schemas-upnp-org:service:SwitchPower:1">
            <newTargetValue>1</newTargetValue>
        </u:SetTarget>
    </s:Body>
</s:Envelope>
```

FIG. 12

```
HTTP/1.1 200 OK
EXT:
CONTENT-TYPE: text/xml ; charset="utf-8"
SERVER: Windows NT/5.0, UPnP/1.0, Intel CLR SDK/1.0
Content-Length: 290

<?xml version="1.0" encoding="utf-8"?>
<s:Envelope s:encodingStyle="http://schemas.xmlsoap.org/soap/encoding/" xmlns:s="http://schemas.xmlsoap.org/soap/envelop
    <s:Body>
        <u:SetTargetResponse xmlns:u="urn:schemas-upnp-org:service:SwitchPower:1" />
    </s:Body>
</s:Envelope>
```

FIG. 14

```
<script language="javascript">
    function OnDimmer()
    {
        var request = new ActiveXObject("Microsoft.XMLHTTP");
        request.onreadystatechange = function(){
            if(request.readyState==4)
            {
                var res = request.responseText;
            }
        } request.open("POST", "http://10.88.171.127:54174/_SwitchPower.0001_control", true);
        request.setRequestHeader('SOAPACTION', '¥"urn:schemas-upnp-org:service:SwitchPower:1#SetTarget¥"');
        request.setRequestHeader('Content-Type', 'text/xml ; charset=¥"utf-8¥"');

request.send("<?xml version=¥"1.0¥" encoding=¥"utf-8¥"?><s:Envelope s:encodingStyle=¥"http://schemas.xmlsoap.org
    }
    function OffDimmer()
    {
        var request = new ActiveXObject("Microsoft.XMLHTTP");
        request.onreadystatechange = function(){
            if(request.readyState==4)
            {
                var res = request.responseText;
            }
        } request.open("POST", "http://10.88.171.127:54174/_SwitchPower.0001_control", true);
        request.setRequestHeader('SOAPACTION', '¥"urn:schemas-upnp-org:service:SwitchPower:1#SetTarget¥"');
        request.setRequestHeader('Content-Type', 'text/xml ; charset=¥"utf-8¥"');

request.send("<?xml version=¥"1.0¥" encoding=¥"utf-8¥"?><s:Envelope s:encodingStyle=¥"http://schemas.xmlsoap.org
    }
</script>
```

US 8,402,108 B2

SYSTEM FOR PROVIDING WEB PAGE HAVING HOME NETWORK FUNCTION AND METHOD OF CONTROLLING HOME NETWORK DEVICES

CROSS-REFERENCE TO RELATED APPLICATION

This application claims the benefit of Korean Patent Application No. 2006-116068, filed on Nov. 22, 2006 in the Korean Intellectual Property Office, the disclosure of which is incorporated herein in its entirety by reference.

BACKGROUND OF THE INVENTION

1. Field of the Invention

Aspects of the present invention relate to a system for constructing a home network and a method of controlling devices using the system, and more particularly, to a system and method of implementing a home network by using a web page including a control point function.

2. Description of the Related Art

In general, a personal computer (PC) automatically recognizes peripheral devices using a plug and play function. Accordingly, a user can easily install the peripheral devices. Universal plug and play (UPnP) is a technology for expanding the functions in the whole network, and allowing devices (such as PCs, peripheral devices, and/or electronic appliances) to automatically recognize each other when the devices are connected to the network.

FIG. 1 is a structural view showing an existing UPnP network system. Referring to FIG. 1, a UPnP network system includes a control point 11 and UPnP devices 12 and 13. The UPnP devices 12 and 13 may be, for example, a media server 12 and a media renderer 13.

The control point 11 recognizes the UPnP devices 12 and 13 existing in the network and controls the recognized UPnP devices 12 and 13. The media server 12 provides UPnP contents, such as media contents. In particular, the media server 12 may provide a content directory service and a connection manager service. The media renderer 13 renders the UPnP contents provided by the media server 12 according to the UPnP. A digital TV for reproducing media contents is an example of the media renderer 13.

The UPnP forum defines standards for home network devices. According to the standards, home network devices are developed and provided to ensure compatibility. However, when additional functions that are not defined in the standards are required, the additional functions cannot be processed. Since each function of the devices 12 and 13 depends on the standards, when the user requires functions that are not in the standards and the functions that are not in the standards are provided, the functions are not compatible with standard devices. Therefore, when new functions are added to the UPnP devices 12 and 13, the control point 11 requires a function to use the new functions. When the new functions are added to the UPnP devices according to the standards, a function may be added to the control point 11 through a firmware upgrade. However, a normal user may have difficulty upgrading the firmware. In addition, when a function that does not follow the standards exists in UPnP devices 12 and 13, providing the function to the control point 11 is limited. More specifically, in order to use newly discovered UPnP devices, the existing home network control point 11 installs software corresponding to the devices through a firmware update. The firmware update has complex processes and has problems of security and stability of the devices.

SUMMARY OF THE INVENTION

Aspects of the present invention relate to a system for providing a web page having a home network function and a method of controlling home network devices capable of conveniently using home network devices in various standards without a firmware upgrade by providing a web page including a control point.

According to an aspect of the present invention, there is provided a system for providing a web page having a home network function, the system including: a plurality of universal plug and play (UPnP) devices forming a UPnP network, wherein a first UPnP device from among the plurality of UPnP devices includes a web browser having a control point to control one or more other UPnP devices from among the plurality of UPnP devices.

The control point may include: a user interface unit to manage an interface for a user on the web page displayed through the web browser; a discovery unit to discover the one or more other UPnP devices; and a control unit to control a service provided by a UPnP device selected from among the discovered other UPnP devices by using the user interface unit.

The discovery unit may multicast a discovery request message to the one or more other UPnP devices and receive discovery response messages from the discovered other UPnP devices that respond to the discovery request message.

The control unit may perform XML (extensible markup language) and HTTP (hypertext transfer protocol) Client functions.

The control unit may transmit control instruction data used to control the service of the selected UPnP device to the selected UPnP device according to an interpretation result of a source code of the web page.

The source code of the web page may include information corresponding to a service control instruction for the UPnP devices.

The source code of the web page may be represented as JavaScript language.

The web browser may connect to a web server that provides the web page in order to display the web page.

The web page may be stored locally in the first UPnP device and the web browser displays the web page stored locally.

According to another aspect of the present invention, there is provided a method of controlling home network devices, the method including: displaying a web page through a web browser having a control point used to control one or more UPnP devices; and controlling the one or more UPnP devices through the displayed web page by operating the control point.

The displaying of the web page may include connecting the web browser to a web server to display a web page provided from the web server.

The displaying of the web page may include connecting the web browser to a web server to display a web page stored locally.

The controlling of the one or more UPnP devices may include: discovering the one or more UPnP devices forming a network in a multicasting method; and controlling a service provided by an UPnP device selected from among the discovered UPnP devices.

The discovering of the UPnP devices may include: multicasting a discovery request message to the one or more UPnP devices forming the network; and receiving discovery response messages from the discovered UPnP devices responding to the discovery request message.

The controlling of the service provided by the selected UPnP device may be performed by a unit having XML and HTTP Client functions.

The controlling of the service provided by the selected UPnP device may be performed in correspondence with control instruction data used to control the service of the selected UPnP device according to an interpretation result of a source code of the web page.

The source code of the web page may include information corresponding to a service control instruction for the UPnP devices.

The source code of the web page may be represented as JavaScript language.

According to another aspect of the present invention, there is provided a method of discovering one or more UPnP devices of a network controlled by a control point of a web page, the method including: multicasting a discovery request message to the one or more UPnP devices forming the network; and receiving a discovery response message from each of the discovered UPnP devices that respond to the discovery request message.

According to another aspect of the present invention, there is provided a control point of a web page controlling one or more UPnP devices of a network, the control point including: a discovery unit to discover the one or more UPnP devices; and a control unit to control a service provided by a UPnP device selected from among the discovered UPnP devices.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4 illustrates a result of the web page shown in FIG. 3 that is interpreted by the web server;

FIG. 5 illustrates a structure of a web page including Asynchronous JavaScript and extensible markup language (XML) (Ajax).

FIG. 8 shows an example of an object structure of a discovery unit;

FIG. 9 shows an example of JavaScript providing a discovery function;

FIG. 10 illustrates an example of a web page structure having a control point function using JavaScript;

FIG. 11 shows an example of control instruction data that is transmitted to an UPnP device selected by a control unit;

FIG. 12 shows an example of a response message that is controlled by control instruction data in a selected UPnP device;

FIG. 14 illustrates an example of control instruction data written in JavaScript code in order to control an on or off function of Dimmer;

DETAILED DESCRIPTION OF THE EMBODIMENTS

Figure 1:
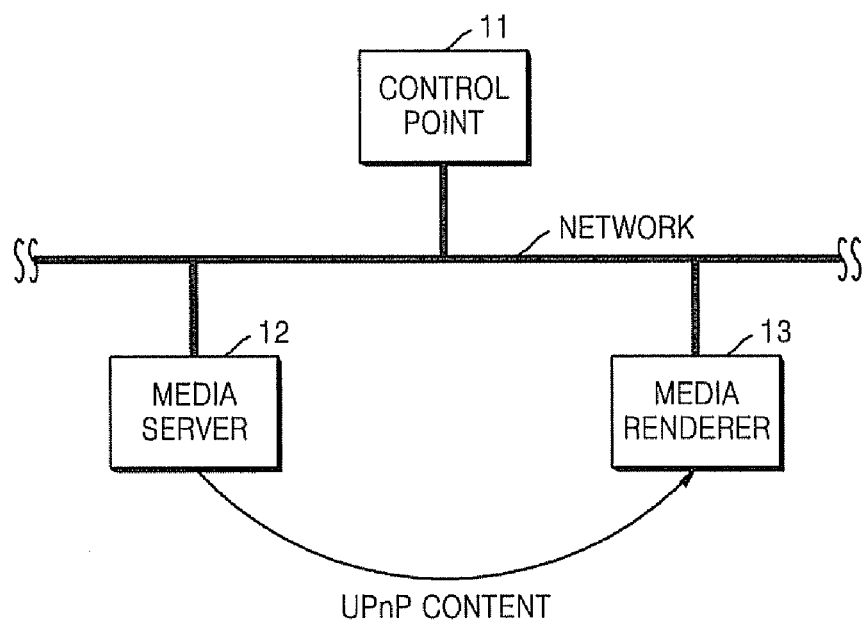
FIG. 1 is a structural view showing an existing universal plug and play (UPnP) network system.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

In order to describe aspects of the present invention, a schematic description of a web page is now provided. As the use of the Internet spreads, users require various functions on a web page. Functions to process the required functions are provided to a web server. Now, a general web server does not provide only fixed functions based on a compiled binary. Rather, the general web server is constructed to easily correspond to the changing requirements by using an interpreter method. IIS of Microsoft and Apache of Open Source are examples of web servers using the interpreter method. A general construction of the web server is shown in FIG. 2.

Figure 2:
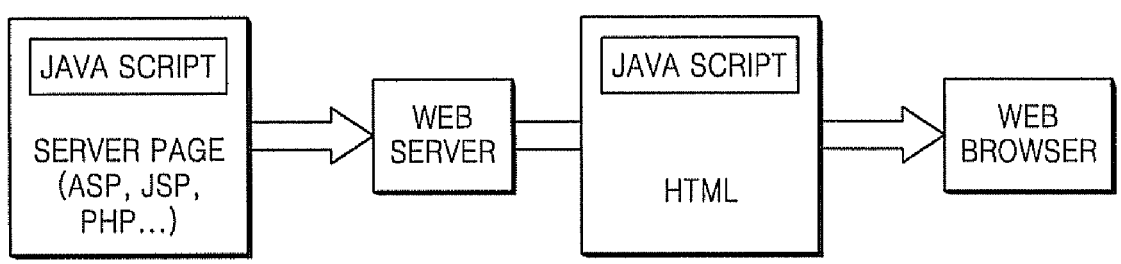
FIG. 2 is a view explaining a method of displaying a web page by a web server.

FIG. 2 is a view explaining a method of displaying a web page by a web server. In a web server, web pages exist. When a user requires a web page, the web server interprets the web page and transmits the web page to the user so that the user sees the web page interpreted by the web server. Active server pages (ASP), professional hypertext markup language (HTML) preprocessor (PHP), and java server pages (JSP) are examples of web pages.

Figure 3:
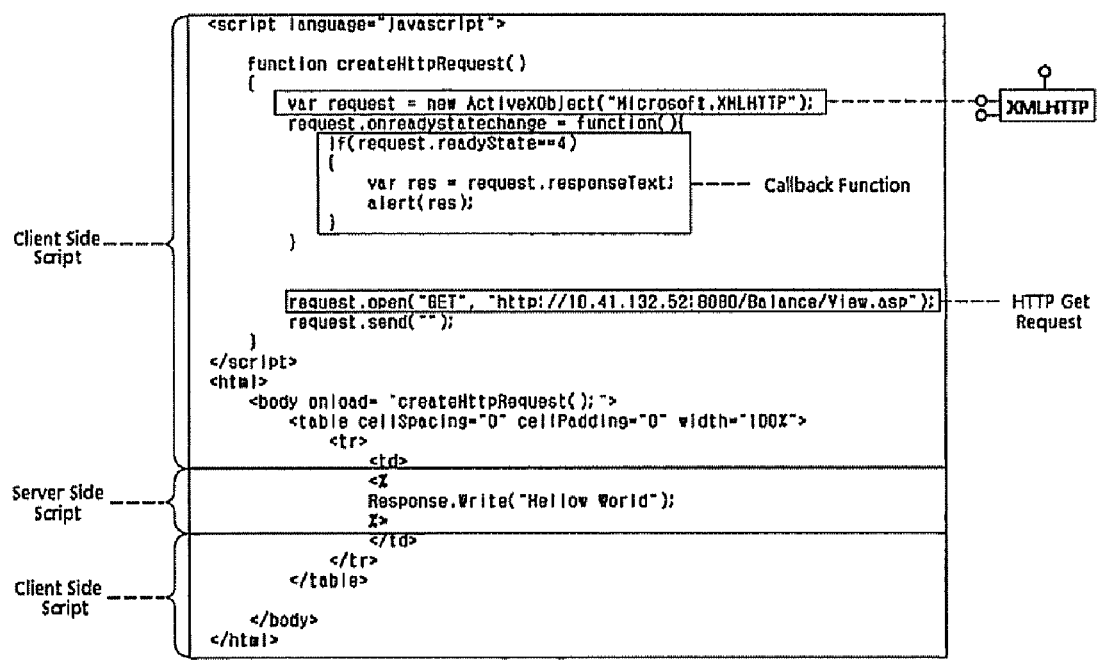
FIG. 3 illustrates an example of a web page provided in a web server.

FIG. 3 illustrates an example of a web page provided in a web server. FIG. 3 shows a web page (ASP) before an interpretation by the web server. The web page may be split into a client side script transmitted to a client and a server side script interpreted by the web server. The web server processes the server side script to transmit the processed script as a result that can be interpreted by the client.

FIG. 4 illustrates a result of the web page shown in FIG. 3 that is interpreted by the web server. The server side script shown in FIG. 3 is processed by the web server. As various requirements from a user occur, the web page, rather than simply being shown, includes a script in order to process data. The JavaScript shown in FIG. 4 is an example. This data is not interpreted by the web server, but interpreted and processed by a user.

The JavaScript basically provides only simple functions defined in a web browser. However, as Asynchronous JavaScript and extensible markup language (XML) (Ajax) is added thereto, the JavaScript can perform XML and hypertext transfer protocol (HTTP) client functions.

FIG. 5 illustrates a structure of a web page including the Ajax. The Ajax is proposed by Microsoft and is provided from most web browsers such as Internet Explorer, Netscape, Firefox, Opera, etc. The XML and HTTP Client functions provided by the Ajax are used to directly connect the web page to the web server to process data. The Ajax based on the JavaScript is the client side script and may use various functions without providing a load on the server. More specifically, the Ajax provides functions so that the XML and HTTP Client functions are used in the web page to use external data. The functions provided by the Ajax provide functions needed to process various home network requirements (including the UPnP). However, the functions provided by the Ajax do not provide functions to search for devices in the network. In order to solve the aforementioned problems, aspects of the present invention provide a method of using and providing home network functions in the web page. A general UPnP framework is constructed based on the XML, HTTP, and multicast, so that the XML and HTTP Client functions supported by the Ajax may be functions to be used as the UPnP framework.

Figure 6:
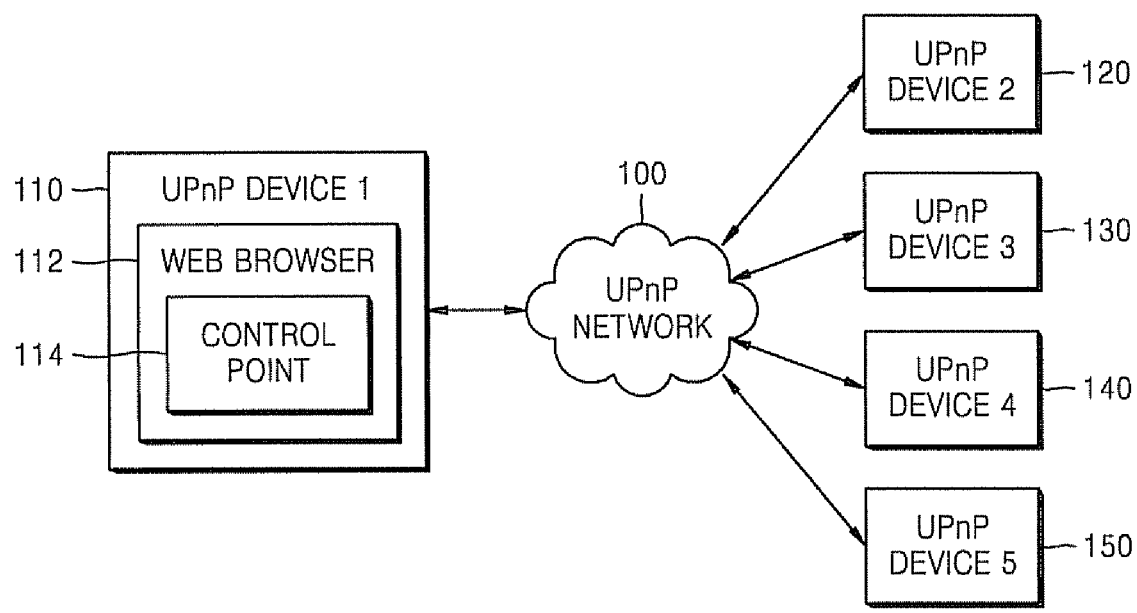
FIG. 6 illustrates a structure of a whole system providing a web page having a home network function according to an embodiment of the present invention.

FIG. 6 illustrates a structure of a whole system providing a web page having a home network function according to an embodiment of the present invention. A UPnP network 100 and UPnP devices 1 to 5 110 to 150 connected to the UPnP network 100 are shown. Here, the UPnP device 1 110 includes a web browser 112, and the web browser 112 includes a control point 114 to control the UPnP devices 2 to 5 120 to 150.

Figure 7:
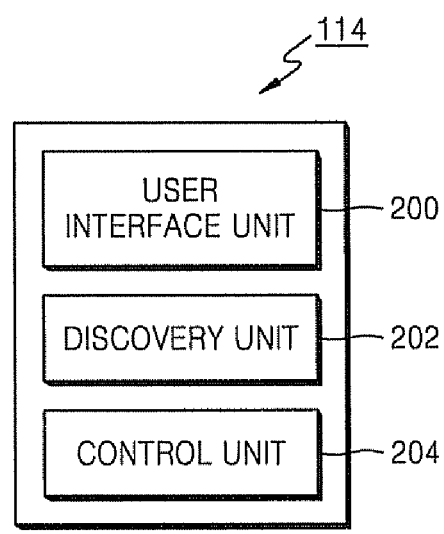
FIG. 7 is a block diagram showing components of a control point shown in FIG. 6.

FIG. 7 is a block diagram showing components of the control point 114 shown in FIG. 6. The control point 114 includes a user interface unit 200, a discovery unit 202, and a control unit 204.

The user interface unit 200 manages an interface with a user on a web page displayed through the web browser. In particular, the user interface unit 200 displays a list of the UPnP devices 2 to 5 120 to 150 discovered by the discovery unit 202. In addition, the user interface unit 200 receives selection information on a UPnP device selected by the user in the displayed list of the UPnP devices 2 to 5 120 to 150.

The discovery unit 202 discovers the UPnP devices 2 to 5 120 to 150 in a multicasting method. The discovery unit 202 multicasts a discovery request message to all the UPnP devices 120 to 150 connected to the UPnP network 100. The UPnP devices 2 to 5 120 to 150 connected to the UPnP network 100 then transmit discovery response messages to the discovery unit 202 to respond to the discovery request message. When the discovery unit 202 receives the discovery response messages transmitted from the UPnP devices 2 to 5 120 to 150, the discovery unit 202 generates the list of the UPnP devices 2 to 5 120 to 150 and outputs the generated list to the user interface unit 200. The user interface unit 200 displays the list of the UPnP devices 2 to 5 120 to 150 received from the discovery unit 202 on a web page.

FIG. 8 shows an example of an object structure of the discovery unit 202. A structure of a discovery object is shown in a class diagram. When an external system calls the object, a user datagram protocol (UDP) socket is opened to receive the multicast message.

FIG. 9 shows an example of JavaScript providing a discovery function. A function for discovering UPnP devices by using a multicast object is provided.

When the user selects a UPnP device from the displayed list of the UPnP devices 2 to 5 120 to 150, the user interface unit 200 outputs selection information on the selected UPnP device to the control unit 204.

The control unit 204 controls a service provided by the selected UPnP device. For example, when the selected UPnP device is the UPnP device 2 120, the control unit 204 outputs a list of services provided by the UPnP device 2 120 to the user interface unit 200. The user interface unit 200 displays the list of the services provided by the UPnP device 2 120 on a web page. Thereafter, the user selects one or more services from the service list, and the user interface 200 output selection information on the one or more selected services to the control unit 204. The control unit 204 outputs control instruction data corresponding to the selection information on the service to the UPnP device 2 120.

To output the control instruction data, the control unit 204 includes the Ajax for performing the XML and HTTP Client functions as shown in FIG. 5. More specifically, the control unit 204 transmits the control instruction data for controlling the one or more services of the selected UPnP device to the selected UPnP device according to an interpretation result of a source code of the web page. Here, the source code of the web page includes information corresponding to the service control instruction for the UPnP devices. The source code of the web page may be represented as JavaScript language.

FIG. 10 illustrates an example of a web page structure having a control point function using JavaScript. As shown in FIG. 10, the web page includes HTML for the user interface, JavaScript having a function of a control point of the media server from among the UPnP devices, Java script having a function of a control point of a printer from among the UPnP devices, and JavaScript for providing a basic control point function for the UPnP devices. In JavaScript according to the prior art, HTTP Client, XML parsing, and a multicast system do not exist. However, the JavaScript according to aspects of the present invention includes the Ajax which manages a Microsoft.XMLHTTP function and an external library including Samsung.Discovery to manage a discovery function.

FIG. 11 shows an example of control instruction data that is transmitted to a UPnP device selected by the control unit 204. FIG. 12 shows an example of a response message that is controlled by the control instruction data in the selected UPnP device.

The web browser 112 having the aforementioned control point 114 connects to a web server (not shown) to display the web page provided from the web server or display a web page stored locally. More specifically, according to aspects of the present invention, when the web browser is operated in order to control the home network, UPnP devices can be controlled even when the web browser does not connect to the web server by using the web pages stored locally inside the UPnP devices.

Figure 13:
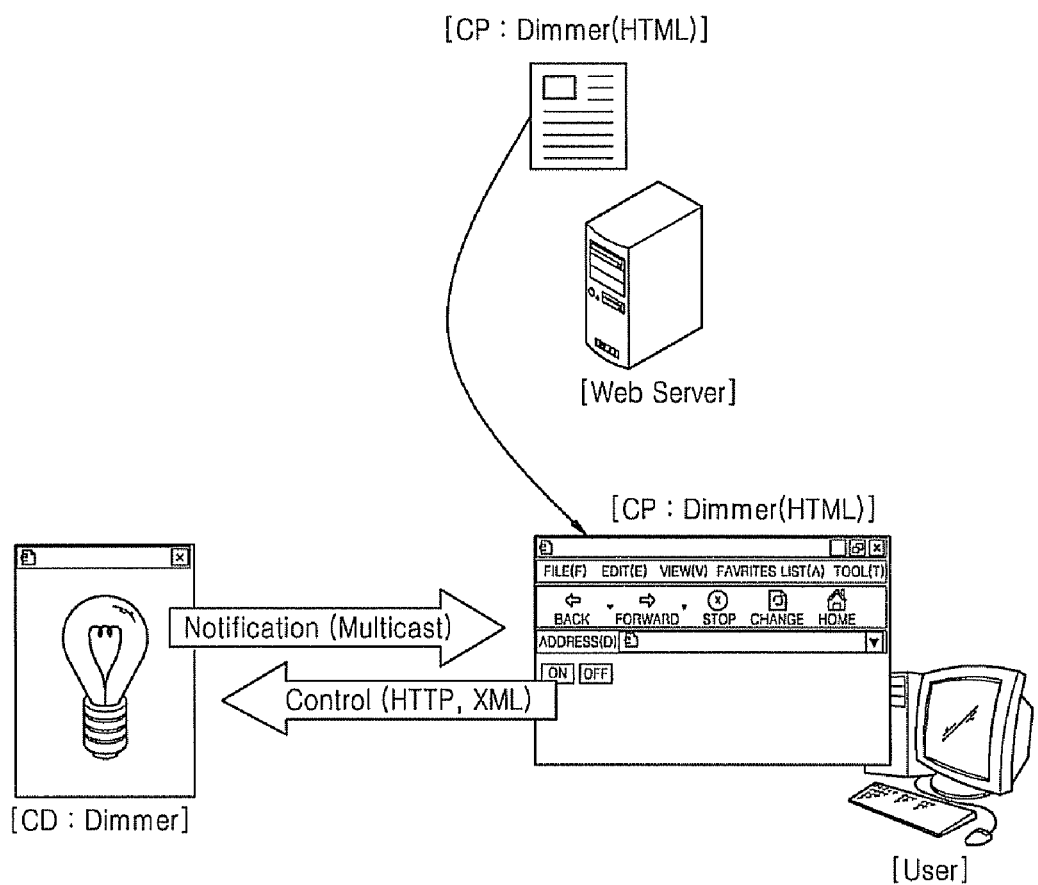
FIG. 13 illustrates an example of a practical test process according to an embodiment of the present invention.

FIG. 13 illustrates an example of a practical test process according to an embodiment of the present invention. An external web server exists, and Dimmer (a UPnP test program of Intel) is executed in a personal computer in an internal network. A user PC is connected to a CP HTML file that can use the UPnP Dimmer existing in the web server through the web browser. The user PC discovers the Dimmer in the internal network according to a UPnP standard. In this case, the user presses a button on the web browser to transmit control data to the PC in which the Dimmer is executed in the internal network according to the UPnP standard.

FIG. 14 illustrates an example of control instruction data written in JavaScript code in order to control an on or off function of the Dimmer. As described above, the system for providing the web page having the home network function according to aspects of the present invention provides a control point function on the web page by using, for example, the Microsoft.XMLHTTP Object (which is the core of the Ajax) and the discovery function that is additionally provided.

Therefore, the user can use the control point function in a device including the web browser operated according to standards.

Figure 15:
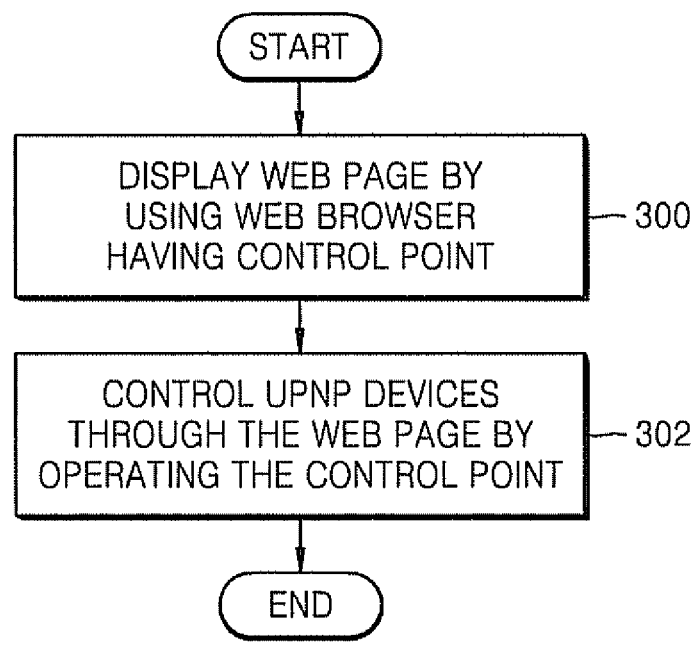
FIG. 15 is a flowchart showing a method of controlling home network devices according to an embodiment of the present invention.

Hereinafter, a method of controlling home network devices according to aspects of the present invention will be described in detail with reference to the attached drawings. FIG. 15 is a flowchart showing a method of controlling home network devices according to an embodiment of the present invention.

First, a web page is displayed by using a web browser having a control point to control UPnP devices (operation 300). In this case, when displaying the web page, the web browser may connect to a web server to display a web page provided from the web server or display a web page stored locally in a UPnP device. After displaying the web page (operation 300), the control point is operated by using the displayed web page to control the UPnP device (operation 302).

Figure 16:
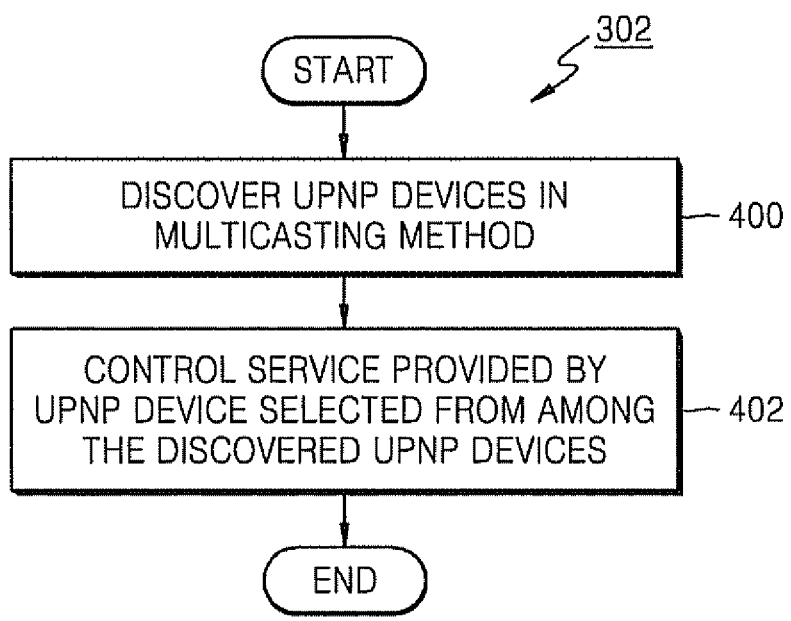
FIG. 16 is a flowchart explaining operation 302 in FIG. 15 according to an embodiment of the present invention.

FIG. 16 is a flowchart explaining operation 302 in FIG. 15 according to an embodiment of the present invention. First, UPnP devices forming the network are discovered in a multicasting method (operation 400).

Figure 17:
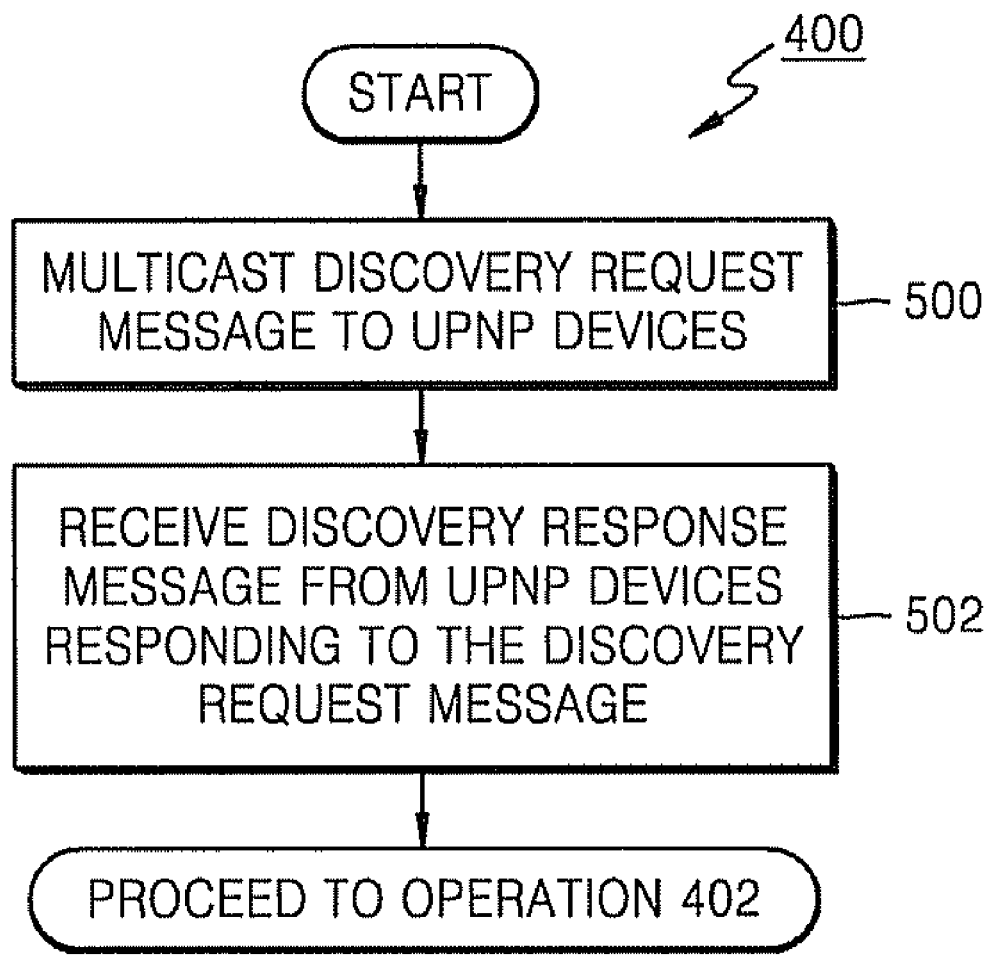
FIG. 17 is a flowchart explaining operation 400 in FIG. 16 according to an embodiment of the present invention.

FIG. 17 is a flowchart explaining operation 400 in FIG. 16 according to an embodiment of the present invention. The discovery request message is multicasted to the UPnP devices forming the network (operation 500). For example, the discovery unit 202 shown in FIG. 7 multicasts the discovery request message to all of the UPnP devices connected to the UPnP network. The UPnP devices connected to the UPnP network then transmit discovery response messages responding to the discovery request message to the discovery unit 202.

The discovery response messages are received from the UPnP devices responding to the discovery request message (operation 502). When the discovery unit 202 receives the discovery response messages from the UPnP devices connected to the UPnP network, the discovery unit 202 generates a list of the UPnP devices transmitting the discovery response messages to display the list on the web page.

Referring to FIG. 16, after discovering the UPnP devices, a service provided by an UPnP device selected from among the discovered UPnP devices is controlled (operation 402). Here, the operation of controlling the service provided by the selected UPnP device is performed by a unit having the XML and HTTP Client functions. An example of the unit having the XML and HTTP Client functions includes the Ajax. As illustrated in FIG. 7, the control unit 204 transmits the control instruction data for controlling the service of the selected UPnP device to the selected UPnP device according to an interpreted result of a source code of the web page. Here, the source code of the web page includes information corresponding to the service control instruction for the UPnP device so that the source code of the web page is represented as JavaScript language.

The system for providing a web page having a home network function and the method of controlling a home network device according to aspects of the present invention can use a control point function without limitation in various home network devices. In other words, when a web browser exists, home network devices using various standards can be used. Accordingly, firmware updates of the control point are not needed for new UPnP devices. In addition, a control point function that does not follow the standards can use a specific function instead of the standards by using an HTML document on a web page.

Aspects of the present invention can also be embodied as computer-readable codes/instructions/programs on a computer-readable recording medium such as a general-purpose digital computer for operating the codes/instructions/programs by using the computer-readable recording medium. The computer-readable recording medium is any data storage device that can store data which can be thereafter read by a computer system. Examples of the compute-readable recording medium include read-only memory (ROM), random-access memory (RAM), CD-ROMs, magnetic tapes, floppy disks, optical data storage devices, and a computer data signal embodied in a carrier wave comprising a compression source code segment comprising the code and an encryption source code segment comprising the code (such as data transmission through the Internet). The computer-readable recording medium can also be distributed over network-coupled computer systems so that the computer-readable code is stored and executed in a distributed fashion. Also, functional programs, codes, and code segments for accomplishing aspects of the present invention can be easily construed by programmers skilled in the art to which the present invention pertains.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A system for providing a web page having a home network function, the system comprising:
   a plurality of universal plug and play (UPnP) devices forming a UPnP network; and
   a first UPnP device from among the plurality of UPnP devices, the first UPnP device comprising a web browser having a control point that controls one or more of the other UPnP devices from among the plurality of UPnP devices, the control point comprising,
      a user interface unit to manage an interface for a user on the web page displayed through the web browser;
      a discovery unit to discover the one or more other UPnP devices; and
      a control unit to control a service provided by an UPnP device selected from among the discovered other UPnP devices,
   wherein at least one of the one or more other UPnP devices comprises a function not defined by UPnP standards, and the control point is configured to control the function not defined by UPnP standards without performing a software or firmware update.

2. The system as claimed in claim 1, wherein the discovery unit multicasts a discovery request message to the one or more other UPnP devices and receives discovery response messages from the discovered other UPnP devices that respond to the discovery request message.

3. The system as claimed in claim 1, wherein the control unit performs XML (extensible markup language) and HTTP (hypertext transfer protocol) Client functions.

4. The system as claimed in claim 3, wherein the control unit transmits control instruction data, used to control the service of the selected UPnP device, to the selected UPnP device according to an interpretation result of a source code of the web page.

5. The system as claimed in claim 4, wherein the source code of the web page comprises information corresponding to a service control instruction for the UPnP devices.

6. The system as claimed in claim 4, wherein the source code of the web page is represented as JavaScript language.

7. The system as claimed in claim 1, wherein the web browser connects to a web server that provides the web page in order to display the web page.

8. The system as claimed in claim 1, wherein the web page is stored locally in the first UPnP device and the web browser displays the web page.

9. A method of controlling network devices, the method comprising:
displaying a web page through a web browser having a control point used to control one or more UPnP devices; and
controlling the one or more UPnP devices through the displayed web page by operating the control point,
wherein the control point discovers the one or more UPnP devices forming a network, controls a service provided by a UPnP device selected from among the discovered UPnP devices, and displays the web page, and
wherein at least one of the one or more other UPnP devices comprises a function not defined by UPnP standards, and the control point is configured to control the function not defined by UPnP standards without performing a software or firmware update.

10. The method as claimed in claim 9, wherein the displaying of the web page comprises:
connecting the web browser to a web server;
providing the web page from the web server; and
displaying the web page provided from the web server.

11. The method as claimed in claim 9, wherein the displaying of the web page comprises:
connecting the web browser to a web server;
providing the web page from a local storage; and
displaying the web page.

12. The method as claimed in claim 9, wherein the discovering of the UPnP devices using the multicasting method comprises:
multicasting a discovery request message to the one or more UPnP devices forming the network; and
receiving a discovery response message from each of the discovered UPnP devices that respond to the discovery request message.

13. The method as claimed in claim 9, wherein a unit having XML and HTTP Client functions controls the service provided by the selected UPnP device.

14. The method as claimed in claim 13, wherein the controlling of the service provided by the selected UPnP device comprises:
interpreting a source code of the web page; and
transmitting control instruction data, used to control the service of the selected UPnP device, to the selected UPnP device according to the interpreted source code of the web page.

15. The method as claimed in claim 14, wherein the source code of the web page comprises information corresponding to a service control instruction for the UPnP devices.

16. The method as claimed in claim 14, wherein the source code of the web page is represented as JavaScript language.

17. A non transitory computer-readable recording medium storing instructions for causing a processor to execute a method comprising:
displaying a web page through a web browser having a control point used to control one or more UPnP devices; and
controlling the one or more UPnP devices through the displayed web page by operating the control point,
wherein the control point discovers the one or more UPnP devices forming a network, controls a service provided by a UPnP device selected from among the discovered UPnP devices, and displays the web page, and
wherein at least one of the one or more other UPnP devices comprises a function not defined by UPnP standards, and the control point is configured to control the function not defined by UPnP standards without performing a software or firmware update.

18. A non transitory computer-readable recording medium storing a control point of a web page that is displayed through a web browser, the control point stored inside a UPnP device and comprising:
a discovery unit to discover one or more other UPnP devices; and
a control unit to control a service provided by a UPnP device selected from among the discovered UPnP devices,
wherein the control point causes a processor to discover the one or more UPnP devices forming a network, controls a service provided by a UPnP device selected from among the discovered UPnP devices, and displays the web page, and
wherein at least one of the one or more other UPnP devices comprises a function not defined by UPnP standards, and the control point is configured to control the function not defined by UPnP standards without performing a software or firmware update.

19. The non transitory computer-readable recording medium as claimed in claim 18, wherein the control point further comprises: a user interface unit to manage an interface for a user on the web page.

20. The non transitory computer-readable recording medium as claimed in claim 18, wherein the discovery unit multicasts a discovery request message to the one or more UPnP devices and receives discovery response messages from the discovered UPnP devices that respond to the discovery request message.

21. The non transitory computer-readable recording medium as claimed in claim 18, wherein the control unit performs XML (extensible markup language) and HTTP (hypertext transfer protocol) Client functions.

22. The non transitory computer-readable recording medium as claimed in claim 21, wherein the control unit transmits control instruction data, used to control the service of the selected UPnP device, to the selected UPnP device according to an interpretation result of a source code of the web page.

23. The non transitory computer-readable recording medium as claimed in claim 22, wherein the source code of the web page comprises information corresponding to a service control instruction for the one or more UPnP devices.

24. The non transitory computer-readable recording medium as claimed in claim 22, wherein the source code of the web page is represented as JavaScript language.

25. The non transitory computer-readable recording medium as claimed in claim 22, wherein the source code of the web page comprises:
HTML code to represent the interface;
first JavaScript code having a function of a control point of the selected UPnP device; and
second JavaScript code to provide basic control point functions for the plurality of UPnP devices.

26. The non transitory computer-readable recording medium as claimed in claim 25, wherein the second JavaScript code includes Ajax.

* * * * *